US 6,761,640 B2

(12) United States Patent
Deo

(10) Patent No.: US 6,761,640 B2
(45) Date of Patent: Jul. 13, 2004

(54) RETAINER FOR UNIVERSAL JOINT BEARING CUPS

(75) Inventor: Yogesh A. Deo, Pune (IN)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/229,940

(22) Filed: Aug. 28, 2002

(65) Prior Publication Data

US 2003/0045364 A1 Mar. 6, 2003

Related U.S. Application Data

(60) Provisional application No. 60/316,288, filed on Aug. 31, 2001.

(51) Int. Cl.$^7$ ................................................ F16D 3/40
(52) U.S. Cl. .................. 464/130; 464/136; 24/910
(58) Field of Search .................. 464/130, 136; 403/12, 155; 24/329, 334, 662, 910; 285/114; 138/91; 16/425, 421, 428, DIG. 24, DIG. 25; 220/213, 252, 375; 215/306, 317; D9/446, 454; 206/428, 805; 294/148; 224/254

(56) References Cited

U.S. PATENT DOCUMENTS

| | | | | |
|---|---|---|---|---|
| 1,610,344 A | * | 12/1926 | Williams | |
| 2,301,927 A | * | 11/1942 | Brogden | ................. 294/148 X |
| 3,254,385 A | * | 6/1966 | Van Horn, Sr. | ............. 464/136 |
| 4,203,524 A | * | 5/1980 | Wieland | ................. 220/375 X |
| 4,269,338 A | * | 5/1981 | Sichel | |
| 4,416,645 A | * | 11/1983 | Fredericks | |
| 5,000,609 A | | 3/1991 | Dutkiewicz et al. | |
| 5,325,988 A | * | 7/1994 | Ekern | |
| 5,876,234 A | * | 3/1999 | Hester | |
| 6,206,223 B1 | * | 3/2001 | Wicker | ........................ 220/375 |

FOREIGN PATENT DOCUMENTS

GB  2060136 A  *  4/1981  ................. 464/130

* cited by examiner

Primary Examiner—Greg Binda
(74) Attorney, Agent, or Firm—MacMillan, Sobanski & Todd, LLC

(57) ABSTRACT

A retainer for retaining a pair of bearing cups on an opposed pair of trunnions of a universal joint cross includes a pair of cup-shaped end portions that are connected together by an intermediate strap portion. The retainer is expandable from a contracted size, wherein the cup-shaped end portions are spaced apart from one another by a first distance, to an expanded size, wherein the cup-shaped end portions are spaced apart from one another by a second distance that is greater than the first distance. The retainer, or at least a portion thereof, is preferably formed from a single material that is relatively flexible, stretchable, or otherwise expandable to permit the retainer to be selectively expanded from the contracted size to the expanded size. During installation, the retainer is initially expanded to the expanded size to allow the end portions to be disposed about the bearing cups supported on the trunnions of the universal joint cross. Then, the retainer is returned to the contracted size so that the end portions reliably retain the bearing cups on the trunnions and prevent them from being inadvertently removed and lost, such as during shipment.

11 Claims, 3 Drawing Sheets

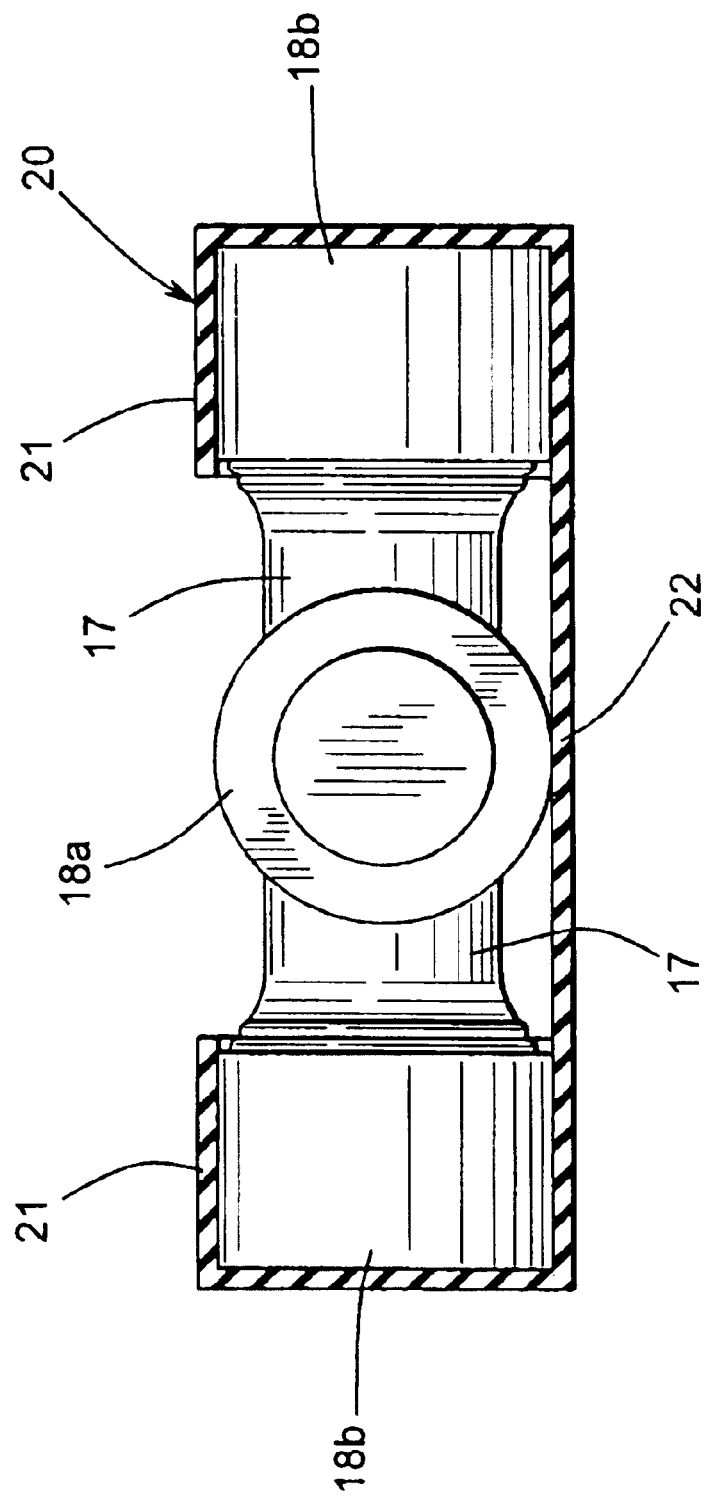

RETAINER FOR UNIVERSAL JOINT BEARING CUPS

CROSS REFERENCE TO RELATED APPLICATION

This application claims the benefit of U.S. Provisional Application No. 60/316,288, filed Aug. 31, 2001, the disclosure of which is incorporated herein by reference.

BACKGROUND OF THE INVENTION

This invention relates to an improved structure for quickly, inexpensively, and reliably retaining a pair of bearing cups on an opposed pair of trunnions on a cross for a universal joint during shipment from one manufacturing location to another.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Each of the universal joints typically includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or other friction-reducing structures are provided between the outer cylindrical surfaces of the trunnions and the inner cylindrical surfaces of the bearing cups to permit rotational movement of the bearing cups relative to the trunnions during operation of the universal joint. In the front universal joint of the above-described driveshaft assembly, the bearing cups supported on the first opposed pair of the trunnions on a front cross are connected to the front end fitting of the driveshaft assembly, while the bearing cups supported on the second opposed pair of the trunnions on the front cross are connected to an end fitting secured to the output shaft of the engine/transmission assembly. Similarly, in the rear universal joint of the above-described driveshaft assembly, the bearing cups supported on the first opposed pair of the trunnions on a rear cross are connected to the rear end fitting of the driveshaft assembly, while the bearing cups supported on the second opposed pair of the trunnions on the rear cross are connected to an end fitting secured to the input shaft of the axle assembly.

Frequently, the driveshaft assembly (including the driveshaft tube, the front and rear end fittings, and the crosses for the front and rear universal joints) is assembled at a first manufacturing location, then shipped as a unit to a second manufacturing location for assembly with the other components of the vehicle drive train system. In such an assembly process, the bearing cups supported on the first opposed pairs of the trunnions on both the front and rear crosses are connected to the associated front and rear end fittings of the driveshaft assembly. However, the bearing cups supported on the second opposed pairs of the trunnions on the front and rear crosses are not positively retained thereon. As a result, these non-retained bearing cups can move apart from one another on the crosses, such as when the respective universal joints are purged with lubricant. Also, these non-retained bearing cups can be inadvertently removed from the crosses and become lost during shipment from the first manufacturing location to the second manufacturing location.

To address this, a variety of straps are known in the art for positively retaining these bearing cups on their associated crosses. However, known retainer straps have been found to be somewhat time-consuming to install and remove. Also, known retainer straps are usually intended for a single use only and, therefore, have been found to relatively expensive. Lastly, in some instances, known retainer straps have been found to themselves become dislodged from the bearing cups during shipment. Accordingly, it would be desirable to provide an improved structure for quickly, inexpensively, and reliably retaining a pair of bearing cups on an opposed pair of trunnions on a cross for a universal joint during shipment from one manufacturing location to another.

SUMMARY OF THE INVENTION

This invention relates to an improved structure for quickly, inexpensively, and reliably retaining a pair of bearing cups on an opposed pair of trunnions on a cross for a universal joint during shipment from one manufacturing location to another. The retainer includes a pair of cup-shaped end portions that are connected together by an intermediate strap portion. The retainer is expandable from a contracted size, wherein the cup-shaped end portions are spaced apart from one another by a first distance, to an expanded size, wherein the cup-shaped end portions are spaced apart from one another by a second distance that is greater than the first distance. The retainer, or at least a portion thereof, is preferably formed from a single material that is relatively flexible, stretchable, or otherwise expandable to permit the retainer to be selectively expanded from the contracted size to the expanded size. During installation, the retainer is initially expanded to the expanded size to allow the end portions to be disposed about a pair of bearing cups supported on respective trunnions of a universal joint cross. Then, the retainer is returned to the contracted size so that the end portions reliably retain the bearing cups on the trunnions and prevent them from being inadvertently removed and lost during shipment. The retainer can be installed upon the bearing cups quickly and easily, without the use of any tools, and can be re-used.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a sectional elevational view showing the bearing cup retainer installed on a cross supported on the end of the driveshaft assembly illustrated in FIG. 2.

DETAILED DESCRIPTION OF THE PREFERRED EMBODIMENT

Figure 1:
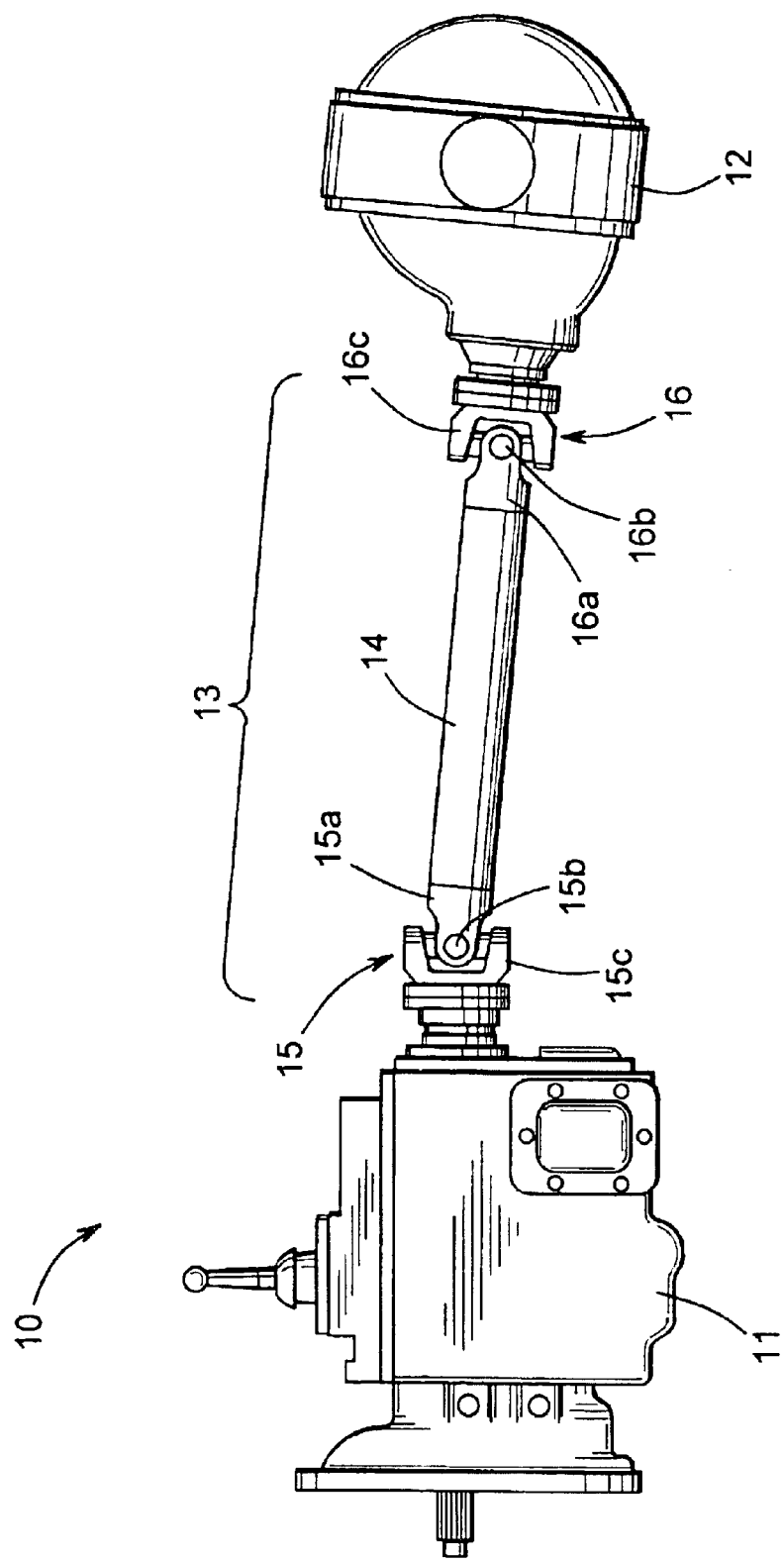
FIG. 1 is a side elevational view of a conventional vehicle drive train system including a driveshaft assembly.

Referring now to the drawings, there is illustrated in FIG. 1 a drive train system, indicated generally at 10, for a vehicle that is adapted to transmit rotational power from an engine/transmission assembly 11 to a plurality of driven wheels (not shown). The illustrated drive train assembly 10 is conventional in the art and is intended merely to illustrate one environment in which this invention may be used. Thus, the scope of this invention is not intended to be limited for use with the specific structure for the vehicle drive train assembly 10 illustrated in FIG. 1 or to vehicle drive train assemblies in general. On the contrary, as will become apparent below, this invention may be used in any desired environment for the purposes described below.

The illustrated drive train system 10 includes a transmission 11 having an output shaft (not shown) that is connected to an input shaft (not shown) of an axle assembly 12 through a driveshaft assembly 13. The transmission 11 is rotatably driven by an engine (not shown) that generates rotational power in a conventional manner. The driveshaft assembly 13 includes a cylindrical driveshaft tube 14 having a center portion and a pair of opposed end portions. The output shaft of the transmission 11 and the input shaft of the axle assembly 12 are typically not co-axially aligned. To accommodate this, a pair of universal joints, indicated generally at 15 and 16, are provided to respectively connect the end portions of the driveshaft tube 14 to the output shaft of the transmission 11 and to the input shaft of the axle assembly 12. The first universal joint 15 includes a tube yoke 15a that is secured to the forward end portion of the driveshaft tube 14 by any conventional means, such as by welding. The first universal joint 15 further includes a cross 15b that is connected to the tube yoke 15a in a conventional manner. Lastly, the first universal joint 15 includes an end yoke 15c that is connected to the output shaft of the transmission 11 and to the cross 15b. Similarly, the second universal joint 16 includes a tube yoke 16a that is secured to the rearward end portion of the driveshaft tube 14 by any conventional means, such as by welding. The second universal joint 16 further includes a cross 16b that is connected to the tube yoke 16a in a conventional manner. Lastly, the second universal joint 16 includes an end yoke 16c that is connected to the cross 16b and to the input shaft of the axle assembly 12. The front and rear universal joints 15 and 16 provide a rotational driving connection from the output shaft of the transmission 11 through the driveshaft tube 14 to the input shaft of the axle assembly 12, while accommodating a limited amount of angular misalignment between the rotational axes of these three shafts.

Figure 2:
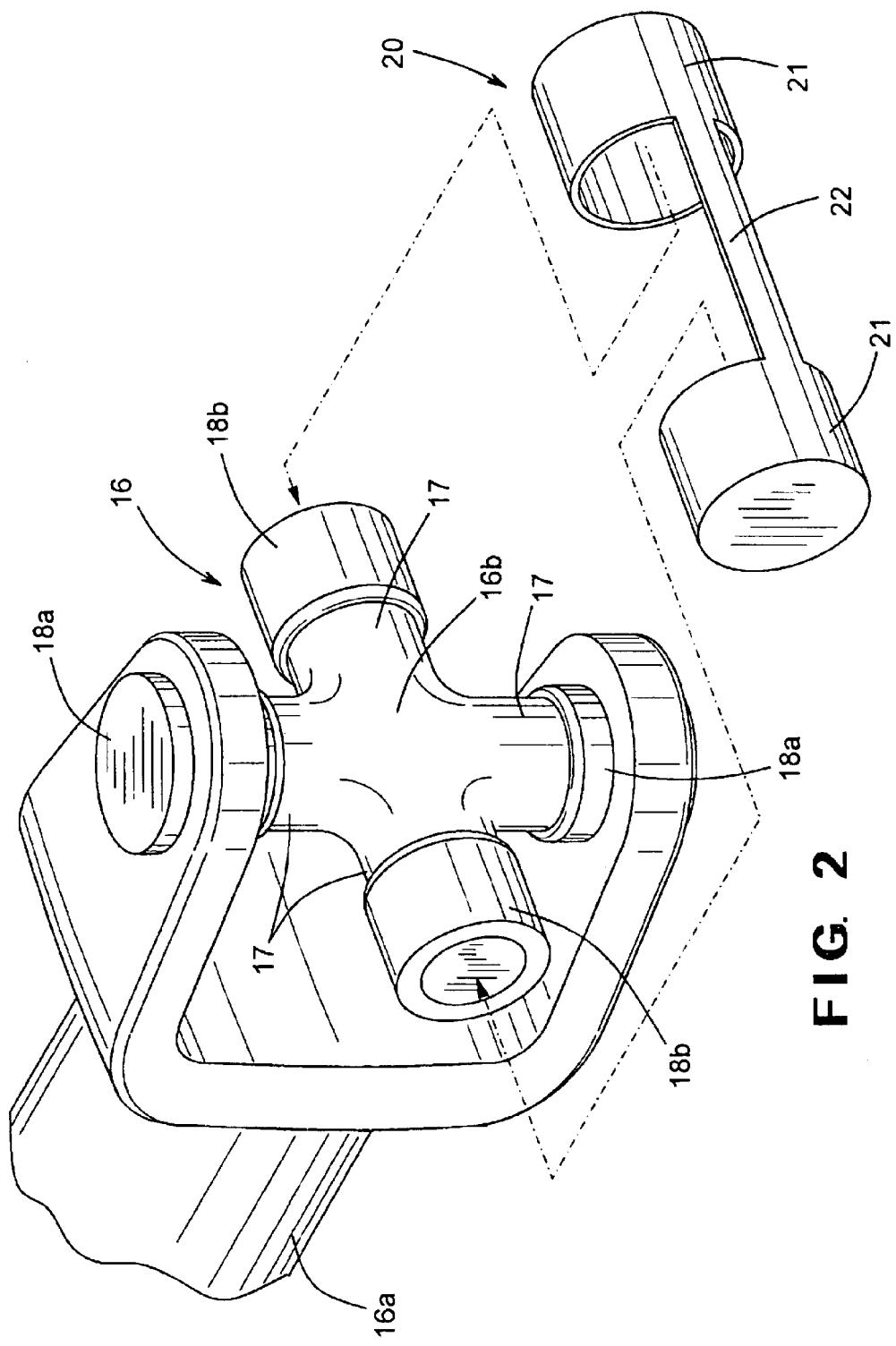
FIG. 2 is an exploded perspective view of an end of the driveshaft assembly illustrated in FIG. 1 and a bearing cup retainer in accordance with this invention shown prior to installation.

The rear end of the driveshaft assembly 13 and a portion of the rear universal joint 16 are shown in detail in FIG. 2. As shown therein, the cross 16b of the rear universal joint 16 has a central body portion with four cylindrical trunnions 17 extending outwardly therefrom. The trunnions 17 are oriented in a single plane and extend at right angles relative to one another. A first pair of hollow cylindrical bearing cups 18a is mounted on the ends of a first opposed pair of the trunnions 17 of the cross 16b. A second pair of hollow cylindrical bearing cups 18b is mounted on the ends of a second opposed pair of the trunnions 17 of the cross 16b. Each of the bearing cups 18a and 18b is generally hollow and cylindrical in shape, including a circumferential side wall and an outer circular end wall. Needle bearings or other friction-reducing structures (not shown) are provided between the outer cylindrical surfaces of the trunnions 17 and the inner cylindrical surfaces of the bearing cups 18a and 18b to permit rotational movement of the bearing cups 18a and 18b relative to the associated trunnions 17 during operation of the universal joint 16b. The bearing cups 18a and 18b supported on the first opposed pair of the trunnions 17 on the rear cross 16b are connected to the tube yoke 16a that is secured to the rearward end portion of the driveshaft tube 14. However, the bearing cups 18b supported on the second opposed pair 18b of the trunnions 17 on the rear cross 16b are not positively retained thereon.

A retainer, indicated generally at 20, is provided for positively retaining the pair of bearing cups 18b on the associated trunnions 17 of the cross 16b, such as during shipment of the driveshaft assembly 13 from one manufacturing location to another, as described above. The retainer 20 includes a pair of cup-shaped end portions 21 that are connected together by an intermediate strap portion 22. Each of the end portions 21 is generally hollow and cylindrical in shape, although such is not necessary. In the illustrated embodiment, each of the end portions 21 of the retainer 20 includes a circumferential side wall and an outer circular end wall. Thus, the end portions 21 are cup-shaped structures that open inwardly toward one another. The interiors of the end portions 21 of the retainer 20 are preferably slightly larger in size than the bearing cups 18b that are supported on the associated trunnions 17 of the cross 16b. For example, the circumferential side walls of the end portions 21 may each be formed having an axial length that is approximately the same as the axial length of each of the circumferential side walls of the bearing cups 18a and 18b, and the circular end walls extend completely across the end walls of the bearing cups 18a and 18b. However, the circumferential side walls of the end portions 21 may be formed having any desired axial length. Furthermore, the end walls of the end portions 21 need not extend completely across the end walls of the bearing cups 18a and 118b if desired, but rather may have one or more openings formed therethrough. The strap portion 22 is generally flat and rectangular in shape. However, the sizes and shapes of the end portions 21 and the strap portion 22 of the retainer 20 may be varied as desired to accommodate crosses 17 and bearing cups 18a and 18b of varying shapes and sizes.

The retainer 20 is expandable from a contracted size, wherein the cup-shaped end portions 21 are spaced apart from one another by a first distance, to an expanded size, wherein the cup-shaped end portions 21 are spaced apart from one another by a second distance that is greater than the first distance. The first distance can be selected such that the distance separating the end portions 21 of the retainer 20 is approximately equal to the distance separating the opposed pair of the bearing cups 18b supported on the associated trunnions 17 of the cross 16b. However, the first distance can be somewhat larger or smaller than the distance separating the opposed pair of the bearing cups 18b supported on the associated trunnions 17 of the cross 16b if desired. The second distance can be selected to be sufficiently larger than the first distance so as to allow the end portions 21 of the retainer 20 to be extended about the opposed pair of the bearing cups 18b supported on the associated trunnions 17 of the cross 16b. Once oriented in this manner, the retainer 20 is returned to the contracted size. As a result, the end portion 21 of the retainer 20 encloses the bearing cups 18b to retain them on the associated trunnions 17 of the cross 16b as shown in FIG. 3, such as during shipment of the driveshaft assembly 13 from one manufacturing location to another as described above.

To accomplish this, the retainer 20, or at least a portion thereof, is preferably formed from a material that is relatively flexible, stretchable, or otherwise expandable to permit the retainer 20 to be selectively expanded from the contracted size to the expanded size. Preferably, the retainer 20 is formed from a single piece of such material. For example, the retainer 20 may be formed from an elastomeric material, such as rubber. If desired, however, the end portions 21 and the strap portion 22 can be formed from different pieces of material that are secured together. For example, the strap portion 22 of the retainer 20 may be formed from the elastomeric material, while the end portions 21 may be formed from other materials. During installation, the strap portion 22 of the retainer 20 is stretched to allow the end portions 21 to be moved to the expanded size. Alternatively, the strap portion 22 of the retainer 20 may be embodied as a spring or similar resilient structure that allows the end portions 21 to be moved in the described manner.

By forming the retainer 20 (or portion thereof) from this expandable material, the retainer 20 can be installed upon the bearing cups 18b quickly and easily, without the use of any tools. During shipment of the driveshaft assembly, the retainer 20 reliably retains the bearing cups 18b on the trunnions 17 and prevents them from being inadvertently removed and lost. Lastly, when the driveshaft assembly 13 is received at the second manufacturing location, the retainer 20 can be quickly and easily removed, again without the use of any tools. The retainer 20 can be returned to the first manufacturing location for re-use, thus reducing the costs associated with providing the retainers 20.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A retainer for retaining a pair of bearing cups on a respective pair of trwinions of a universal joint cross comprising:

first and second end portions that are adapted to be disposed about a pair of bearing cups on a respective pair of opposed trunnions of a universal joint cross, each of said first and second end portions being generally cup-shaped and including a circumferential side wall and an outer circular end wall; and a strap portion extending between said first and second end portions, said retainer being expandable from a contracted size, wherein said first and second end portions are spaced apart from one another by a first distance, to an expanded size, wherein said end portions are spaced apart from one another by a second distance that is greater than the first distance, said first and second end portions and said strap portion comprising a single piece of a flexible material.

2. The retainer defined in claim 1 wherein said strap portion is generally flat and rectangular in shape.

3. The retainer defined in claim 1 wherein said first and second end portions are formed from an elastomeric material.

4. The retainer defined in claim 1 wherein said strap portion is formed from an elastomeric material.

5. The retainer defined in claim 1 wherein said first and second end portions and said strap portion are formed from an elastomeric material.

6. A combined universal joint cross and retainer assembly comprising:

a cross having a central body portion with a pair of trunnions extending outwardly therefrom;

a pair of bearing cups respectively supported on said pair of trunnions; and a retainer retaining said pair of bearing cups on said pair of trunnions, said retainer including first and second end portions that are disposed about said a pair of bearing cups, each of said first and second end portions being generally cup-shaped and including a circumferential side wall and an outer circular end wall, said retainer further including a strap portion extending between said first and second end portions, said retainer being expandable from a contracted size, wherein said first and second end portions are spaced apart from one another by a first distance, to an expanded size, wherein said end portions are spaced apart from one another by a second distance that, is greater than the first distance, said first and second end portions and said strap portion comprising a single piece of a flexible material.

7. The combined universal joint cross and retainer assembly defined in claim 6 wherein said first distance is approximately equal to a distance separating said pair of bearing cups supported on said pair of trunnions.

8. The combined universal joint cross and retainer assembly defined in claim 6 wherein said strap portion is generally flat and rectangular in shape.

9. The combined universal joint cross and retainer assembly defined in claim 6, wherein said first and second end portions are formed from an elastomeric material.

10. The combined universal joint cross and retainer assembly defined in claim 6 wherein said strap portion is formed from an elastomeric material.

11. The combined universal joint cross and retainer assembly defined in claim 6 wherein said first and second end portions and said strap portion are formed from an elastomeric material.

* * * * *